US012130621B2

(12) United States Patent
Gogna

(10) Patent No.: US 12,130,621 B2
(45) Date of Patent: Oct. 29, 2024

(54) COLLABORATIVE VEHICLE GUIDANCE

(71) Applicant: Zoox, Inc., Foster City, CA (US)

(72) Inventor: Ravi Gogna, San Jose, CA (US)

(73) Assignee: Zoox, Inc., Foster City, CA (US)

(*) Notice: Subject to any disclaimer, the term of this patent is extended or adjusted under 35 U.S.C. 154(b) by 536 days.

(21) Appl. No.: 16/852,057

(22) Filed: Apr. 17, 2020

(65) Prior Publication Data

US 2021/0325880 A1 Oct. 21, 2021

(51) Int. Cl.
B60W 30/09 (2012.01)
B60W 30/095 (2012.01)
B60W 60/00 (2020.01)
G05D 1/00 (2024.01)

(52) U.S. Cl.
CPC ........... G05D 1/0061 (2013.01); B60W 30/09 (2013.01); B60W 30/0956 (2013.01); B60W 60/0011 (2020.02); B60W 60/0016 (2020.02); G05D 1/0038 (2013.01)

(58) Field of Classification Search
None
See application file for complete search history.

(56) References Cited

U.S. PATENT DOCUMENTS

| | | | |
|---|---|---|---|
| 9,046,372 B2* | 6/2015 | Mathews | G09B 23/10 |
| 9,465,388 B1 | 10/2016 | Fairfield et al. | |
| 9,632,502 B1* | 4/2017 | Levinson | G08G 1/166 |
| 9,650,042 B2 | 5/2017 | Sujan et al. | |
| 10,239,529 B2 | 3/2019 | Filev et al. | |
| 10,782,694 B2* | 9/2020 | Zhang | G08G 1/167 |
| 10,962,972 B2* | 3/2021 | Koopman | G05D 1/0274 |
| 2018/0251126 A1* | 9/2018 | Linscott | G05D 1/0274 |
| 2018/0364703 A1 | 12/2018 | Liu et al. | |
| 2019/0041862 A1* | 2/2019 | Zaum | G01C 21/3461 |
| 2019/0166180 A1 | 5/2019 | Zhao et al. | |
| 2019/0286151 A1* | 9/2019 | Palanisamy | G08G 1/096816 |
| 2019/0354111 A1* | 11/2019 | Cheng | G05D 1/0027 |
| 2019/0361432 A1 | 11/2019 | Levinson et al. | |
| 2020/0010083 A1* | 1/2020 | Staehlin | B60W 50/00 |

(Continued)

OTHER PUBLICATIONS

Office Action for U.S. Appl. No. 16/852,116, mailed on Jan. 6, 2022, Gogna, "Teleoperations for Collaborative Vehicle Guidance", 14 pages.

(Continued)

Primary Examiner — James J Lee
Assistant Examiner — David Hatch
(74) Attorney, Agent, or Firm — Lee & Hayes, P.C.

(57) ABSTRACT

Techniques to provide guidance to a vehicle operating in an environment are discussed herein. For example, such techniques may include sending a request for assistance, receiving a reference trajectory, and causing the vehicle to determine a trajectory based on the reference trajectory. Data such as sensor data and vehicle state data may be sent from the vehicle to a remote computing device. The computing device outputs a user interface using the data and determines the reference trajectory based on receiving an input in the user interface. The techniques can send an indication of the reference trajectory to the vehicle for use in planning a trajectory for the vehicle. A vehicle, such as an autonomous vehicle, can be controlled to traverse an environment based on the trajectory.

19 Claims, 7 Drawing Sheets

(56) References Cited

U.S. PATENT DOCUMENTS

| | | | |
|---|---|---|---|
| 2020/0033845 A1* | 1/2020 | Park | G05D 1/0055 |
| 2020/0216085 A1* | 7/2020 | Bobier-Tiu | B60W 40/08 |
| 2020/0310417 A1* | 10/2020 | Pedersen | G05D 1/0027 |
| 2021/0004024 A1 | 1/2021 | Whitfield, Jr. et al. | |
| 2021/0271245 A1 | 9/2021 | Bradley et al. | |
| 2021/0323573 A1 | 10/2021 | Gogna | |

OTHER PUBLICATIONS

Office Action for U.S. Appl. No. 16/852,116, mailed on Mar. 31, 2022, Gogna, "Teleoperations for Collaborative Vehicle Guidance", 11 pages.

PCT Search Report and Written Opinion mailed Jul. 15, 2021 for PCT Application No. PCT/US21/25626, 10 pages.

The Extended European Search Report and Written Opinion mailed Feb. 16, 2024 for European patent application No. 21788664.7, 10 pages.

\* cited by examiner

COLLABORATIVE VEHICLE GUIDANCE

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. The planning systems may perform any number of operations (e.g., simulations, etc.) to determine an effect of each detected object on a potential action for the vehicle. However, in certain situations, the vehicle may be unable to navigate past a portion of the environment that impedes progress of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
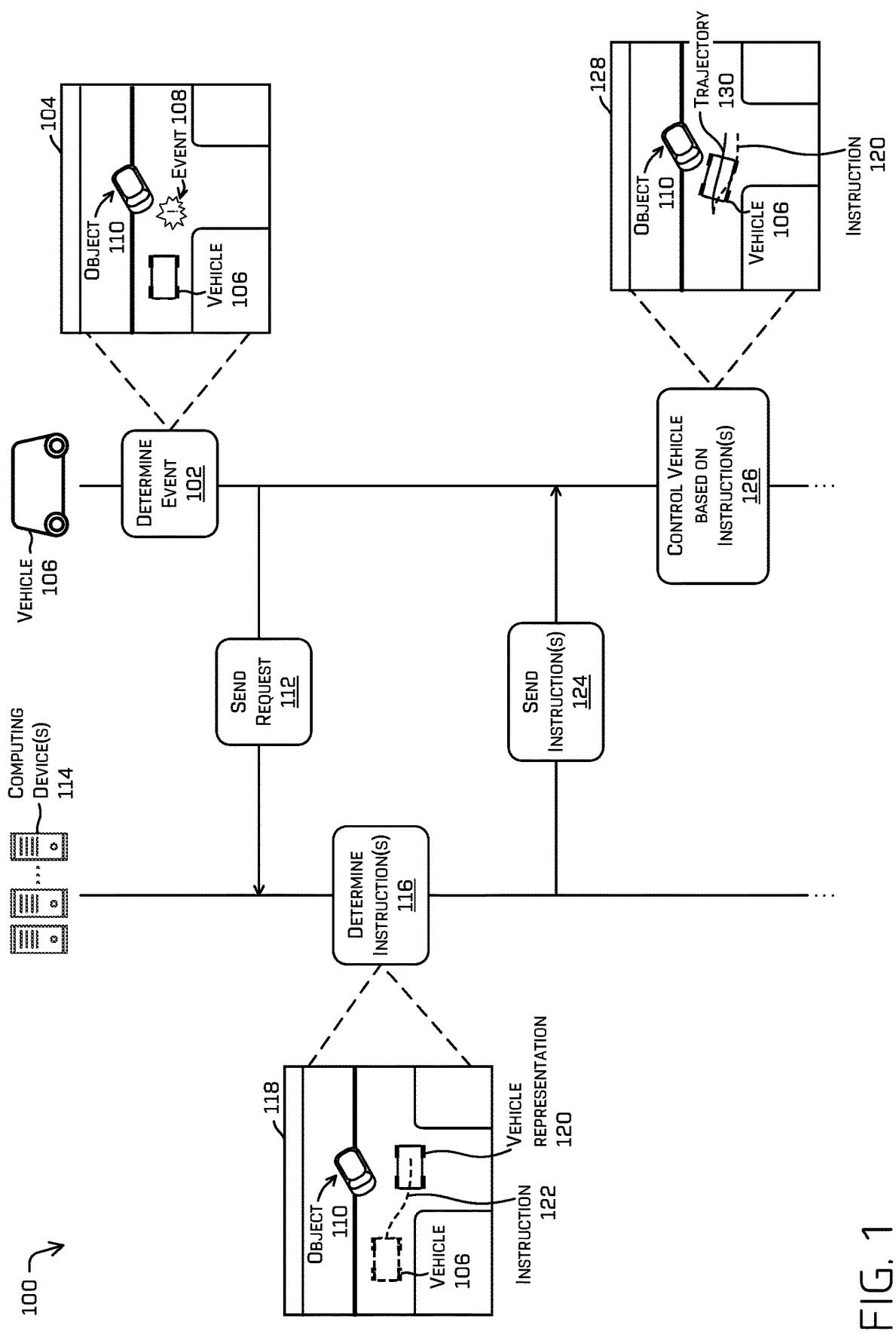
FIG. 1 is a pictorial flow diagram of an example process for implementing vehicle guidance techniques described herein.

A vehicle may request assistance from a remote entity to navigate past an obstacle in an environment that impedes progress of the vehicle. Delays by the remote entity to provide the vehicle assistance may cause the vehicle to remain in place until the assistance is provided, which may delay progress of the vehicle, detract from an experience of a passenger of the vehicle, and may potentially impact the safety of the passenger.

This disclosure is directed to techniques for providing guidance to a vehicle by a computing device that is remote from the vehicle. In some examples, a computing device of a teleoperations center may receive a request for assistance from a vehicle traversing an environment and determine an instruction to guide the vehicle in the environment. In various examples, the computing device may transmit an indication of the instruction to the vehicle. A vehicle computing device of the vehicle may plan a new trajectory for the vehicle based at least in part on receiving the instruction from the computing device. Using the techniques for providing guidance as described herein, a vehicle may receive guidance instructions from a computing device usable by the vehicle to quickly and/or preemptively avoid being stuck thereby improving safety of the vehicle.

In some examples, the vehicle may comprise an autonomous or semi-autonomous vehicle with a vehicle computing device configured to request assistance from a computing device based on encountering a scenario that is difficult to navigate (e.g., in which a planner is unable to plan a route according to a set of driving policies, or otherwise). By way of example and not limitation, an autonomous vehicle may approach a vehicle that is blocking a lane in the road. In some situations, it may not be clear from the circumstances whether the vehicle is broken down, parallel parking, or dropping off a passenger. In that case, the autonomous vehicle may request assistance to move past the blocking vehicle and may receive, based on the request, an indication of an instruction (e.g., a reference trajectory indicating a velocity and a direction) for the vehicle to use to navigate the environment (e.g., traverse to a destination) at a future time.

As noted above, a computing device may determine an instruction to guide a vehicle in an environment. In various examples, the instruction may represent steering, braking, and/or acceleration information as non-limiting examples, though other controls (of internal and/or external components) of the vehicle are contemplated. In some examples, the instruction may represent a reference trajectory (e.g., direction, speed, acceleration, etc.) usable by the vehicle to traverse the environment. For instance, a planning component of the vehicle may determine a trajectory to navigate the vehicle based at least in part on the reference trajectory.

In some examples, the computing device may determine an instruction to guide the vehicle based at least in part on an input(s) received by a user interface output on a display device. For instance, a user interface of the computing device may output a representation of a vehicle in the environment (a model, a simulation, an estimated state, and the like). In some examples, the request for assistance may comprise data (e.g., sensor data associated with a sensor of the vehicle and/or derivatives therefrom (e.g., bounding boxes, classification information, etc.), vehicle state data associated with a vehicle computing device, etc.) sent from the vehicle. The data associated with the request for assistance may represent characteristics of the environment (e.g., building, roadways, objects, drivable areas, weather conditions, and the like). In addition, or in the alternative, data sent to the computing device may indicate a vehicle capability (e.g., acceleration, velocity, steering, braking, and so on) relative to the environment. This data may be used by the computing device to configure the user interface to provide controls capable of maneuvering the representation of the vehicle in the user interface based on the capabilities of the vehicle to navigate the environment.

A teleoperator (e.g., a tactician trained to guide robots remotely or a machine learned computing device) may interact with controls of the user interface to generate an input that maneuvers the representation of the vehicle in the user interface. In various examples, one or more of the controls (e.g., a steering control, a braking control, and/or acceleration control) may be associated with steering, braking, and/or acceleration capabilities of the vehicle in the environment based at least in part on the data received from the vehicle. By outputting controls that behave similar to the capabilities of the vehicle in the environment, the user interface may capture inputs (e.g., changes in a position, a direction, and/or an acceleration) with more accuracy versus typical techniques that guide the vehicle with controls that maneuver the representation of the vehicle in ways that are not possible in the real-world environment (and therefore not helpful to guide the vehicle).

In some examples, the controls to navigate the representation of the vehicle in the user interface are based at least in part on a capability (e.g., a steering capability an acceleration capability, a passenger comfort capability, a kinematic constraint and/or a dynamic constraint, etc.) of the vehicle to navigate in the environment. In some examples, the computing device may determine a movement threshold associated with limiting movement of the representation of the vehicle based at least in part on a capability of the vehicle to navigate in the environment. For instance, a computing device may receive data (e.g., sensor data and/or vehicle control data associated with the vehicle) indicative of a steering rate and/or an acceleration rate for the vehicle in the environment, and apply the rate(s) to one or more controls that are usable to receive an input usable to guide the vehicle. In this way, the input may be thought of as being associated with a rate control (e.g., a control having an acceleration rate, a steering rate, a braking rate, and so on). In some examples, the computing device may send a command to the vehicle that is based at least in part on the rate control(s) and/or movement threshold thereby providing suggested guidance for the vehicle that takes into account actual capabilities (a steering capability, an acceleration capability, a rider comfort capability, and so on) of the vehicle relative to the environment.

In some examples, a computing device may receive sensor data of the environment captured by a sensor of the vehicle (and/or representations thereof) and determine, based at least in part on the sensor data, at least one of: an acceleration threshold, a velocity threshold, or a timing threshold for a representation of the vehicle to navigate in a user interface. For example, the computing device may determine maximum and minimum acceleration, maximum and minimum velocity, and/or maximum and minimum braking for the vehicle based on objects, drivable areas, and other information associated with the sensor data received from the vehicle. In some examples, the timing threshold may represent a time period between receiving an input and causing the representation of the vehicle to visually change from a first position in the user interface to a second position in the user interface. By associating a threshold(s) with the representation of the vehicle as described herein, controls can navigate the vehicle representation with more sophistication and sensitivity over approaches that may simply provide waypoints or other direction input. In some examples, an instruction may be generated by the computing device based on one or more thresholds (e.g., a movement threshold, an acceleration threshold, a velocity threshold, a braking threshold, a timing threshold, and the like) and communicated to a planning component of the vehicle thereby improving vehicle safety by enabling the planning component to determine a trajectory for the vehicle that is based, at least in part, on the one or more thresholds.

In some examples, receiving a user input confirming an instruction may cause an indication of the instruction (e.g., a trajectory, steering, braking, and/or acceleration information) to be transmitted to the vehicle with no action needed by an operator of the computing device. In this way, the computing device may transmit an indication of the instruction to the vehicle without further user input. In various examples, receiving the user input confirming selection of the instruction may cause the indication of the instruction to be transmitted to another vehicle of a fleet of autonomous vehicles. The instruction may, in some examples, be stored in a map that is made available to the fleet of autonomous vehicles. In such an instance, additional vehicles within the fleet of vehicles may leverage the previously provided guidance so as not to have to send a request to a teleoperator when encountering the same (or similar) scenario.

In some examples, the computing device may receive a request for assistance from the vehicle and determine the instruction to guide the vehicle based at least in part on the request for assistance from the vehicle. However, in other examples, an instruction may be determined independent of receiving a request for assistance from the vehicle. For example, the computing device may determine an instruction and/or transmit an indication of the instruction to one or more vehicles proactively to improve safety for the one or more vehicles operating in a vicinity of a portion of the environment associated with the instruction. In some examples, the indication of the instruction may be used by a planning component of a vehicle computing device to improve how the vehicle navigates (avoids and/or interacts with objects) in the environment. In some examples, the computing device may send a reference trajectory (e.g., and the associated rate control, thresholds, etc. associated with the reference trajectory) to the vehicle. In such examples, the vehicle computing device may determine a candidate trajectory for the vehicle based at least in part of the reference trajectory. Generally, the reference trajectory is configured to cause a planning component of the vehicle computing device to determine a trajectory (e.g., the candidate trajectory) to navigate the vehicle in an environment.

In some examples, a vehicle computing device may determine whether to send a request for assistance based at least in part on a cost (e.g., a velocity cost, a direction cost, and the like) associated with a vehicle trajectory. For example, a planning component of the vehicle computing device may determine a cost associated with the vehicle trajectory, determine that the cost meets or exceeds a threshold cost, and send a request for guidance based at least in part on the cost meeting or exceeding the threshold cost. Additional details for determining and/or sending a request for assistance are discussed throughout this disclosure.

In some examples, a vehicle computing device may determine whether to send a request for assistance based at least in part on a confidence level associated with an ability for the vehicle to navigate to a destination in the environment. The confidence level may, for instance, may be associated with an ability for the vehicle to avoid a detected object that may impact operation of the vehicle. An indication of the confidence level of a current vehicle trajectory may be sent by the vehicle to a computing device for use in determining a guidance instruction. In this way, the guidance instruction is based at least in part on the confidence level associated with the ability for the vehicle to navigate to the destination in the environment. Additional details of using confidence levels in vehicle guidance is described in U.S. patent application Ser. No. 15/644,267, filed on Jul. 7, 2017, entitled "Interactions Between Vehicle and Teleoperations System," which is incorporated herein by reference in its entirety.

In various examples, a user interface of a computing device provides controls to maneuver a representation of the vehicle in a simulated environment displayed in the user interface. In some examples, the controls may comprise a steering control, a braking control, and/or an accelerations control, and one or more of these controls may be configured to respond to real-time changes in the environment of the vehicle. For example, a teleoperator may provide an input to the user interface via one or more controls (e.g., a steering wheel, a brake pedal, an acceleration pedal, a hand-held controller, or the like). By providing more realistic controls, the user interface may receive input(s) that better capture an intent of a human interacting with the user interface, and represent that intent in the instruction sent to the vehicle. A vehicle computing device of the vehicle may, in some examples, perform planning considerations based on the input(s) captured using the aforementioned controls.

In some examples, one or more of the controls provided by the user interface may be configured to respond with a rate of steering, a rate of acceleration, and/or a rate of deceleration that the vehicle is capable of making in the environment. In this way, the user interface of the computing device may be thought of as providing rates for the controls that adjust in real-time to provide a realistic driving experience to a teleoperator. By outputting a user interface that provides controls that mimic actual driving conditions, more detailed instructions for guiding the vehicle may be generated and subsequently shared with the vehicle than were possible using prior guidance techniques. Additionally, the techniques described herein may optionally be used by the vehicle during vehicle planning operations (e.g., to determine a trajectory to traverse the environment). This improves vehicle safety by reducing an amount of time the vehicle may be waiting for assistance (e.g., to go around a blocked region or otherwise receive a human interpretation of the environment).

The techniques discussed herein may improve a functioning of a vehicle computing device by outputting an indication of one or more instructions. In some examples, a computing device may improve safety by sharing a rate-controlled suggested trajectory with the vehicle while the vehicle is still moving in the environment. As a result, the vehicle computing device associated with the vehicle can control operation of the vehicle by utilizing planning considerations that identify the suggested trajectory. To mitigate a delay between sending a request for assistance by a vehicle and receiving and/or implementing an instruction by the vehicle, in some examples, the techniques allow the vehicle to adjust its path in the environment while a remote computing device generates a guidance instruction. By implementing the guidance techniques described herein, a vehicle can receive more sophisticated assistance in less time than typical approaches thereby causing the vehicle to navigate around an obstacle or blocked region(s).

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data). In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Additionally, techniques described herein can be used with real data (e.g., captured using sensor(s)), simulated data (e.g., generated by a simulator), or any combination of the two. A computing device may include a user interface through which one or more inputs cause a guidance instruction to be determined for a vehicle to follow in an environment.

FIG. 1 is a pictorial flow diagram of an example process 100 for receiving a request for assistance from a vehicle, determining an instruction for the vehicle, sending the instruction to the vehicle, and controlling the vehicle based on the instruction.

At operation 102, the process can include determining an event that impacts operation of the vehicle. An example 104 illustrates a vehicle 106, an event 108, and an object 110 (e.g., another vehicle) in the environment. In various examples, a vehicle computing device of the vehicle 106 may detect the event 108 (e.g., a potential collision, an obstacle, blocked region, a road closure, signals from a traffic signal or human traffic coordinator, etc.) by capturing sensor data of an environment. In some examples, the sensor data can be captured by one or more sensors on a vehicle (autonomous or otherwise). For example, the sensor data can include data captured by a lidar sensor, an image sensor, a radar sensor, a time of flight sensor, a sonar sensor, and the like.

In some examples, the operation 102 can include determining a classification of an object (e.g., to determine that an object is a pedestrian in an environment). The operation 102 can include determining attributes of the object 110 to determine a location, velocity, heading, etc. of the object 110.

At operation 112, the process can include sending a request for assistance to a computing device(s) 114. For instance, the vehicle 106 may send a request for assistance to navigate past the event 108 to the computing device(s) 114. The computing device(s) 114 may be located remote from the vehicle 106, such as at a teleoperations center that supports a fleet of autonomous vehicles. However, in some examples, the vehicle 106 can perform the operations discussed in the process 100. In some examples, the vehicle 106 may determine to send a request for assistance based on detecting the event 108 and/or based on an object classification (e.g., to verify a classification). Additional details of sending requests for assistance to a teleoperator is described in U.S. patent application Ser. No. 15/644,349, filed on Jul. 7, 2017, entitled "Predictive Teleoperator Situational Awareness," which is incorporated herein by reference in its entirety.

At operation 116, the process can include determining instruction(s) for the vehicle 106 to follow at a future time. As illustrated in example 118, a vehicle representation 120 may be output in a user interface based at least in part on receiving the request for assistance, and optionally controlled to generate instruction 122. The instruction 122 may be representative of a trajectory generated based on one or more inputs to the user interface. Additional details of determining guidance are discussed in connection with FIGS. 2-4, as well as throughout this disclosure.

At operation 124, the process can include the computing device(s) 114 sending the instruction(s) to the vehicle 106. The instruction 122 may comprise acceleration data, velocity data, position data, and so on. Additional details of sending communications via a network are discussed in connection with FIG. 5, as well as throughout this disclosure.

At operation 126, the process can include controlling a vehicle based at least in part on the instruction(s). As illustrated in example 128, the operation 126 can include generating a trajectory 130 for the vehicle 106 to follow (e.g., to avoid the event 108 and/or the object 110). Additional details of controlling steering, acceleration, braking, and other systems of the vehicle is described in U.S. patent application Ser. No. 16/251,788, filed on Jan. 18, 2019, entitled "Vehicle Control," which is incorporated herein by reference in its entirety.

Figure 2:
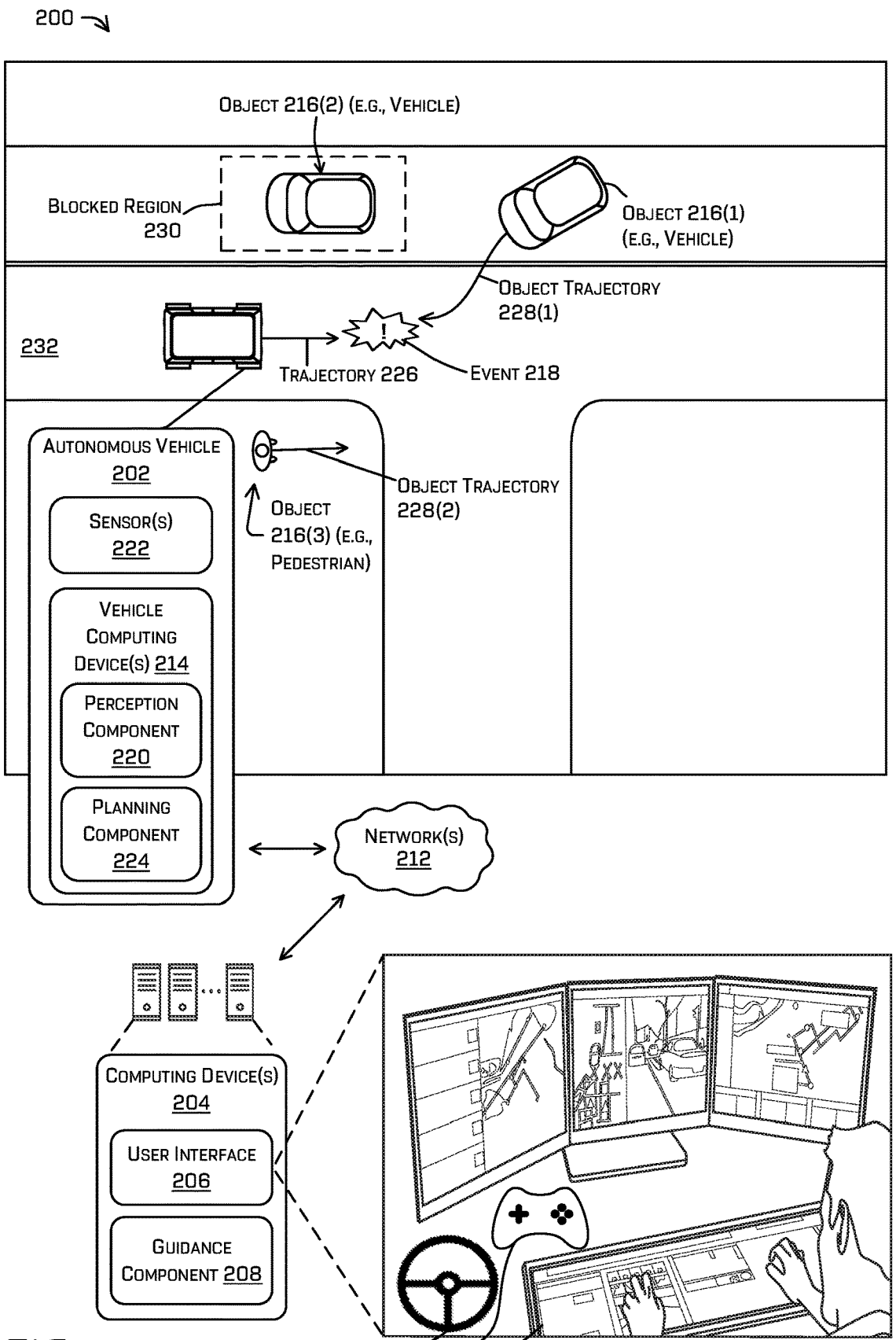
FIG. 2 illustrates an example user interface of a guidance component for providing guidance with respect to an example autonomous vehicle traversing an example environment.

FIG. 2 illustrates an example user interface 200 of a guidance component for providing guidance with respect to an example autonomous vehicle 202 traversing an example environment. In general, the user interface 200 provides an overview of an environment surrounding a vehicle that may be guided (e.g., sent a reference trajectory) by a computing device to assist the vehicle during navigation of the environment.

As depicted in FIG. 2, one or more computing device(s) 204 comprises the user interface 206 and a guidance component 208. As shown in the example of FIG. 2, the user interface 206 comprises controls 210(1), 210(2), 210(3), and so on (collectively referred to as "controls 210") to invoke different functionality based on receiving a user input. In some instances, the autonomous vehicle 202 may send a request for assistance to the computing device 204 via a network(s) 212, and the user interface 200 will provide an indication of the request for assistance (e.g., by changing annotation or an appearance of an indicator). In this way, a teleoperator may, in some examples, provide guidance to the vehicle by selecting one of the controls 210 to cause the computing device 204 to initiate assistance (e.g., output details for a vehicle, receive sensor data from the vehicle, etc.).

The computing device(s) 204 may be included in a teleoperations center that may provide remote assistance to one or more autonomous vehicles in a fleet. In some examples, the teleoperations center may provide guidance to the vehicle in response to a request for assistance from the vehicle. Additional details of determining when to contact a teleoperator as well as techniques for navigating the autonomous vehicle using instructions that are received from the teleoperator are described in U.S. patent application Ser. No. 16/457,289, filed Jun. 28, 2019, entitled "Techniques for Contacting a Teleoperator," which is incorporated herein by reference in its entirety. Additional details of navigating the autonomous vehicle using instructions that are received from the teleoperator are further described in U.S. patent application Ser. No. 16/457,341, filed Jun. 28, 2019, entitled "Techniques for Navigating Vehicles using Teleoperations Instructions," which is incorporated herein by reference in its entirety.

In various examples, the guidance component 208 may receive sensor data and/or vehicle state data associated with the one or more of the vehicles in the environment. In general, the guidance component 208 may be configured to determine an instruction (e.g., a reference trajectory, an acceleration range, a velocity range, a position range, and so on) for the autonomous vehicle 202 to follow at a future time by maneuvering a representation of the vehicle in the user interface. In some examples, the user interface 206 may be included as part of the guidance component 208 to provide guidance with respect to a request for assistance.

As noted above, the user interface 206 may comprise one of the controls 210 to invoke different functionality based on a user input. In some examples, one of the controls 210 may be associated with (and/or limited by) a capability of the autonomous vehicle 202 in the environment. In some examples, the controls 210 may be configured to provide one or more rate-controlled inputs (e.g., an input configured to respond with a rate of steering, a rate of acceleration, and/or a rate of deceleration that the vehicle is capable of making in the environment) to the user interface 206. In some examples, a rate control input may comprise a control that limits a rate of input received by the user interface 206 based at least in part on a kinematic constraint and/or a dynamic constraint of the autonomous vehicle 202. For instance, an acceleration control of the user interface 206 may be limited in an amount of acceleration available based on vehicle state data identifying information about the autonomous vehicle 202 and/or information about the environment. Additional details about the configuration of the controls 210 of the user interface 206 are discussed elsewhere including in FIG. 3 below.

In various examples, a vehicle computing device(s) 214 may be configured to detect one or more objects 216 (e.g., objects 216(1), 216(2), 216(3)) and/or an event 218 in the environment, such as via a perception component 220. In some examples, the vehicle computing device 214 may detect the one or more objects 216, based on sensor data received from one or more sensors 222. In some examples, the sensor(s) 222 may include sensors mounted on the autonomous vehicle 202, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) 222 may include one or more remote sensors, such as, for example sensors mounted on another autonomous vehicle, and/or sensors mounted in the environment.

In various examples, the autonomous vehicle 202 may be configured to transmit and/or receive data from other autonomous vehicles and/or the sensors 222. The data may include sensor data, such as data regarding the one or more objects 216 detected in the environment. In various examples, the environment may include the sensors 222 for traffic monitoring, collision avoidance, or the like. In some examples, the sensors 222 may be mounted in the environment to provide additional visibility in an area of reduced visibility, such as, for example, in a blind or semi-blind intersection.

In various examples, the vehicle computing device 214 may receive the sensor data and may determine a type of object 216 (e.g., classify the type of object), such as, for example, whether the object 216 is a vehicle, such as objects 216(1) and 216(2), a vehicle, a truck, a motorcycle, a moped, a pedestrian, such as object 216(3), or the like.

In various examples, the vehicle computing device 214 may include a planning component 224. In general, the planning component 224 may determine a trajectory 226 for the autonomous vehicle 202 to follow to traverse through the environment. For example, the planning component 224 may determine various routes and trajectories and various levels of detail. In some examples, the planning component 224 may determine a route to travel from a first location (e.g., a current location) to a second location (e.g., a target location). The planning component 224 may determine (via a machined-learned model, for example) a trajectory 228(1) for the vehicle 216(1) that is the most likely trajectory that the vehicle 216(1) may take in the future. Also shown in FIG. 2, the planning component 224 may determine a trajectory 228(2) for the pedestrian 216(3).

FIG. 2 also depicts the vehicle 216(2) associated with a blocked region 230. The blocked region 230 may represent a blocked lane or other region impassible to the autonomous vehicle 202 and/or another vehicle (e.g., vehicle 216(1)) in the environment. In the illustrated example of FIG. 2, the vehicle 216(2) is not moving thereby creating the blocked region 230. In this example, another vehicle 216(1) is associated with a trajectory 228(1) to go around the blocked region 230 by entering a road segment 232 occupied by the autonomous vehicle 202. The autonomous vehicle 202 detects the event 218 (e.g., a potential collision with vehicle 216(1)) and responsive to the detection sends a request for assistance to the computing device(s) 204 via the network(s) 212.

In some examples, the request for assistance may comprise sensor data and/or vehicle state data describing a position, a velocity, an acceleration, and other aspects of the autonomous vehicle relative to the surrounding environment. For example, vehicle state data of the autonomous vehicle 202 may indicate a current trajectory (e.g., trajectory 226), a rate or range of acceleration, velocity, and/or braking capabilities. In some examples, the computing device 204 receives the request for assistance and generates guidance (e.g., an instruction for the autonomous vehicle 202) using a guidance component 208. Instructions from a teleoperator made be received via a user interface 206 output on a display device of the computing device 204. The user interface 206 may, in some examples, be configured to receive an input from the controls 210. In some various examples, one or more of the controls 210(1), 210(2), and 210(3) (e.g., a steering control, a braking control, and/or acceleration control) may be associated with steering, braking, and/or acceleration capabilities of the vehicle in the environment based at least in part on the vehicle state data received from the autonomous vehicle 202.

In some examples, the road segment 232 may be associated with map feature data describing attributes of the road segment (e.g., a start point, an endpoint, road condition(s), a road segment identification, a lane number, and so on). Some or all of the attributes of the road segment 232 may be transmitted to the autonomous vehicle 202 as part of the instruction sent to the autonomous vehicle 202 from the computing device 204.

Figure 3:
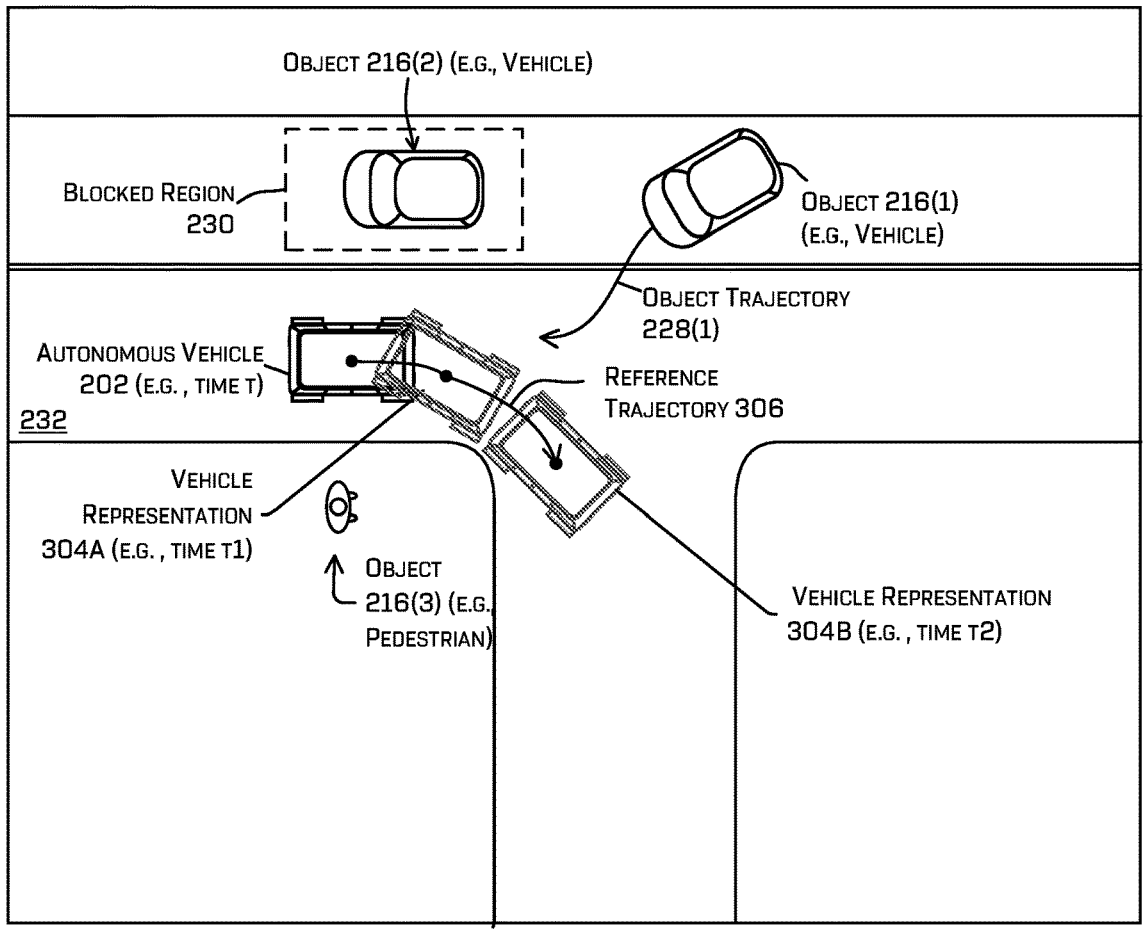
FIG. 3 illustrates another example user interface of a guidance component for providing guidance with respect to an example autonomous vehicle traversing an example environment.

FIG. 3 illustrates another example user interface 300 of a guidance component for providing guidance with respect to an example autonomous vehicle 202 traversing an example environment. In general, user interface 300 may be presented on a display device of the computing devices 204 responsive to receiving an input to maneuver the autonomous vehicle via one or more controls as discussed in relation to FIG. 2 and elsewhere.

As shown in FIG. 3, the user interface 206 may comprise example user interface 300 and/or 302. In some examples, the user interface 302 may comprise one or more images or representations based at least in part on sensor data associated with a sensor of the autonomous vehicle 202. In addition, or in the alternative, the user interface 302 may comprise a model of the environment based at least in part on the sensor data associated with the sensor of the autonomous vehicle 202. In some examples, the user interface 302 may also provide information about the autonomous vehicle 202 (e.g., speed, direction of travel, steering angle, lighting, audio, and the like). The user interface 302 is further illustrated as comprising the road segment 232 that represents a portion of the environment in which the autonomous vehicle 202 may travel to a destination.

As depicted in FIG. 3, multiple images may convey different scenes (front, back, right side, and left side) around the autonomous vehicle 202 including detected objects such as vehicles, pedestrians, bicyclists, and buildings just to name a few.

In some instances, a teleoperator (e.g., a remote human operator and/or a tactician trained to guide robots remotely) associated with the computing device 204 may use one or more of the models (representations, simulations, etc.) of the environment to determine a reference trajectory 306 for the autonomous vehicle 202. By way of example and not limitation, the teleoperator may provide an input to the control(s) 210 to cause a vehicle representation 304A and 304B (collectively "vehicle representation 304") to maneuver in the user interface 300. For instance, the user interface 300 may be used to provide a path, route, trajectory (e.g., the reference trajectory 306), and so on to guide the autonomous vehicle 202. In some examples, the teleoperator may use the control(s) 210 to cause the vehicle representation 304 to an area of the environment that enables the vehicle 216(1) to go around the blocked region 230.

As mentioned above, in some examples, the computing device 204 may receive data indicative of a capability of the autonomous vehicle 202 and configure one or more controls (e.g., the controls 210) to navigate the representation of the vehicle in the user interface. In some examples, the one or more controls may represent a rate control that limits a rate of input associated with the one or more controls based at least in part on a kinematic constraint and/or a dynamic constraint of the autonomous vehicle 202.

In some examples, a kinematic constraint may be associated with kinematic data that indicates motion or potential motion by the autonomous vehicle 202 independent of the factors which cause the motion or the potential motion. In some examples, the kinematic data may indicate one or more kinematic constraints of the autonomous vehicle 202 such as a battery level, a maximum steering angle, a maximum acceleration, and so on). Generally, the kinematic constraint(s) may be based on vehicle state data that indicates a status (e.g., a level, an ability, and/or a limitation) of various systems associated with of the autonomous vehicle 202.

In some examples, a dynamic constraint may be associated with dynamic data that indicates motion or potential motion by the autonomous vehicle 202 with consideration to the factors which cause the motion or the potential motion. Generally, the dynamic constraint(s) may be based on vehicle state data, sensor data, and/or perception data that indicates a status (e.g., a level, an ability, and/or a limitation) of various systems associated with of the autonomous vehicle 202 relative to the environment. In some examples, the dynamic data may indicate one or more dynamic constraints of the autonomous vehicle 202 such as a drivable area, a detected object, a maximum steering angle relative to forces in the environment, a maximum acceleration relative to forces in the environment, and so on).

In some examples, the control(s) may be configured to adjust a rate of acceleration, a rate of steering, or a rate of braking of the input based at least in part on vehicle state data, kinematic data, or dynamic data associated with the autonomous vehicle 202. In various examples, an acceleration rate or a steering rate associated with the input may be used by the computing device 204 to determine guidance (e.g., the reference trajectory) and/or be sent to the autonomous vehicle 202 as part of the reference trajectory.

In various examples, responsive to receiving an input, the vehicle representation 304A may be output on the display device to reflect a suggested trajectory in accordance with the input. In some examples, the computing device 204 may determine the reference trajectory based at least in part on the suggested trajectory. For instance, the teleoperator may provide an input to select the suggested trajectory as the reference trajectory, may modify the suggested trajectory, or add additional portions to the suggested trajectory.

In some examples, the computing device 204 may receive and/or determine a velocity cost associated with the reference trajectory and/or a direction cost associated with the reference trajectory and communicate an indication of the associated cost(s) with the autonomous vehicle 202 which may use the associate cost(s) in planning operations (e.g., to determine a trajectory for the vehicle). For instance, the autonomous vehicle 202 may determine whether the velocity cost meets or exceeds a velocity threshold cost, determine whether the direction cost meets or exceeds a direction threshold cost, and determine a trajectory based at least in part on the velocity cost meeting or exceeding the velocity threshold cost and the direction cost meeting or exceeding the direction threshold cost.

In some examples, the computing device 204 may determine a safety margin for the reference trajectory 306 and/or the road segment 232, and communicate the safety margin to the autonomous vehicle 202 as part of the reference trajectory 306.

In some examples, an input to navigate the representation of the vehicle causes a simulation of the representation of the vehicle in the user interface, wherein the simulation is based at least in part on one or more movement limitations associated with the vehicle traversing the environment. For instance, the reference trajectory may be implemented in a simulation that limits movement of the vehicle representation in accordance with limitations that may limit movement of the vehicle in the environment.

In some examples, the vehicle maintains full autonomy (e.g., continues to perform planning operations) while the guidance techniques are performed by the computing device 204. In some examples, the user interface 300 shows a position and/or an orientation of the autonomous vehicle 202 at a current time (e.g., shown in black) while the vehicle representation 304 is shown in FIG. 3 (e.g., shown in grey to differentiate from the actual location of the vehicle). Thus, the autonomous vehicle 202 may change location in the user interface 300 based on planning operations that cause the autonomous vehicle 202 to navigate the environment (including moving from a first destination to a second destination and/or remaining stationary).

The vehicle representation 304A is associated with a future time (e.g., time T1) after a current time T and the vehicle representation 304B is associated with time T2. In some examples, the reference trajectory 306 indicates one or more of an acceleration rate, a steering rate, a velocity and a direction for the vehicle to use to navigate the environment at a future time (e.g., time T1, T2, T3, . . . TN where N can be any integer equal to or greater than 1). The times T1, T2, T3, . . . TN may represent a time period of varying length, such as every millisecond, 5 milliseconds, 100 milliseconds, 200 milliseconds, 1 second, and the like. In some examples, the times may be any regular or irregular intervals. In some examples, the vehicle representation 304A and the vehicle representation 304B may be shown in FIG. 3 as a single vehicle representation.

In some examples, the reference trajectory 306 generated by the computing device 204 indicates a velocity and a direction for the autonomous vehicle 202 to navigate in the environment at a future time. That is, rather than only provided a general direction to travel in traditional approaches, such as entering waypoints for the vehicle to follow, the reference trajectory 306 represents a velocity and a direction to follow based at least in part on the sensor data and/or vehicle state data that indicate capabilitie(s) of the autonomous vehicle 202. In various examples, the computing device 204 may determine a movement threshold associated with limiting movement of the representation of the vehicle (e.g., vehicle representation 304) based at least in part on a capability of the vehicle to move in the environment. For instance, the input to navigate the vehicle representation 304 may be based at least in part on at least one of a steering capability, a velocity capability, a braking capability, a timing capability, or an acceleration capability of the autonomous vehicle 202 to navigate in the environment. In this way, the vehicle representation 304 may respond to an input by the teleoperator with steering, velocity, braking, timing, and/or acceleration capabilities of the autonomous vehicle 202 as determined from sensor data and/or vehicle state data of the autonomous vehicle 202.

In some examples, the computing device 204 may receive vehicle state data and update a location of a representation of the vehicle in a user interface based at least in part on the vehicle state data. For instance, the user interface 206 may present and update two or more vehicle representations, at least one of the vehicle representations updating in association with changes in direction or position of the vehicle in the environment. In some examples, a user interface may present a first representation of a vehicle that is controllable by an input associated with the user interface, and a second representation of the vehicle that indicates an action (e.g., movement or a direction of the vehicle in the environment).

Figure 4:
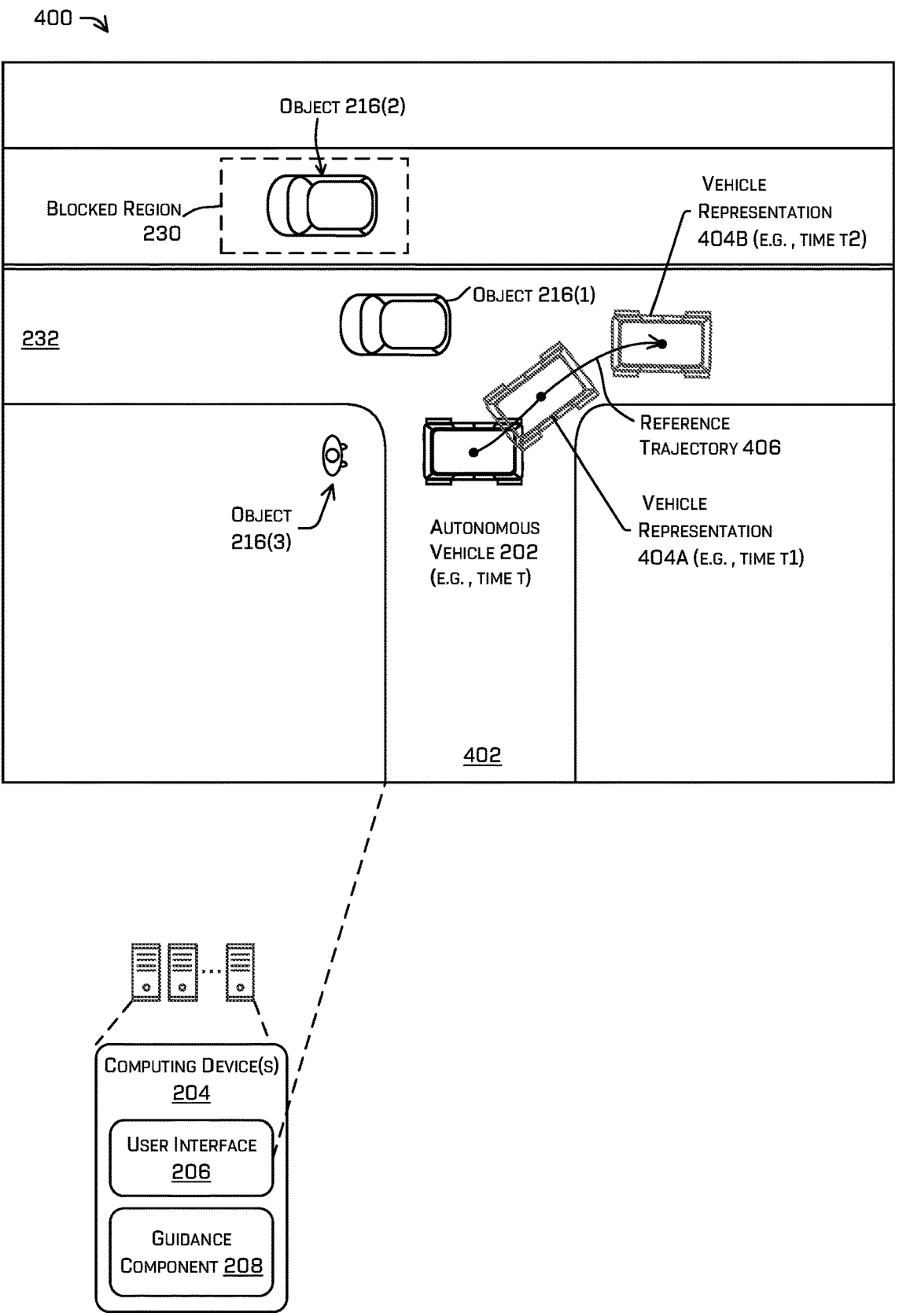
FIG. 4 illustrates yet another example user interface of a guidance component for providing guidance with respect to an example autonomous vehicle traversing an example environment.

FIG. 4 illustrates another example user interface 400 of a guidance component for providing guidance with respect to an example autonomous vehicle 202 traversing an example environment. In general, user interface 400 may be presented on a display device of the computing devices 204 responsive to receiving an input to maneuver the autonomous vehicle via one or more controls as discussed in relation to FIGS. 2 and 3, and elsewhere.

As shown in FIG. 4, the autonomous vehicle 202 is located in a road segment 402 at a current time. Continuing the example from FIG. 3, the autonomous vehicle 202 may arrive at the current position based at least in part on receiving the reference trajectory 306. That is, a planning component of the autonomous vehicle 202 may determine a trajectory for the autonomous vehicle 202 using the reference trajectory determined by the computing device 204.

In some examples, a teleoperator may provide input to the controls 210 to cause the computing device 204 to generate a reference trajectory 406. As shown in FIG. 4, the reference trajectory 406 can guide the autonomous vehicle 202 to the road segment 232 to continue to a destination. For instance, the vehicle representation 404A is associated with a future time (e.g., time T1) after a current time T and the vehicle representation 404B is associated with time T2. In some examples, the reference trajectory 406 indicates a velocity and a direction for the vehicle to use to navigate the environment at a future time (e.g., time T1, T2, T3, . . . TN where N can be any integer equal to or greater than 1). In some examples, the vehicle representation 404A and the vehicle representation 404B may be shown in FIG. 4 as a single vehicle representation.

Figure 5:
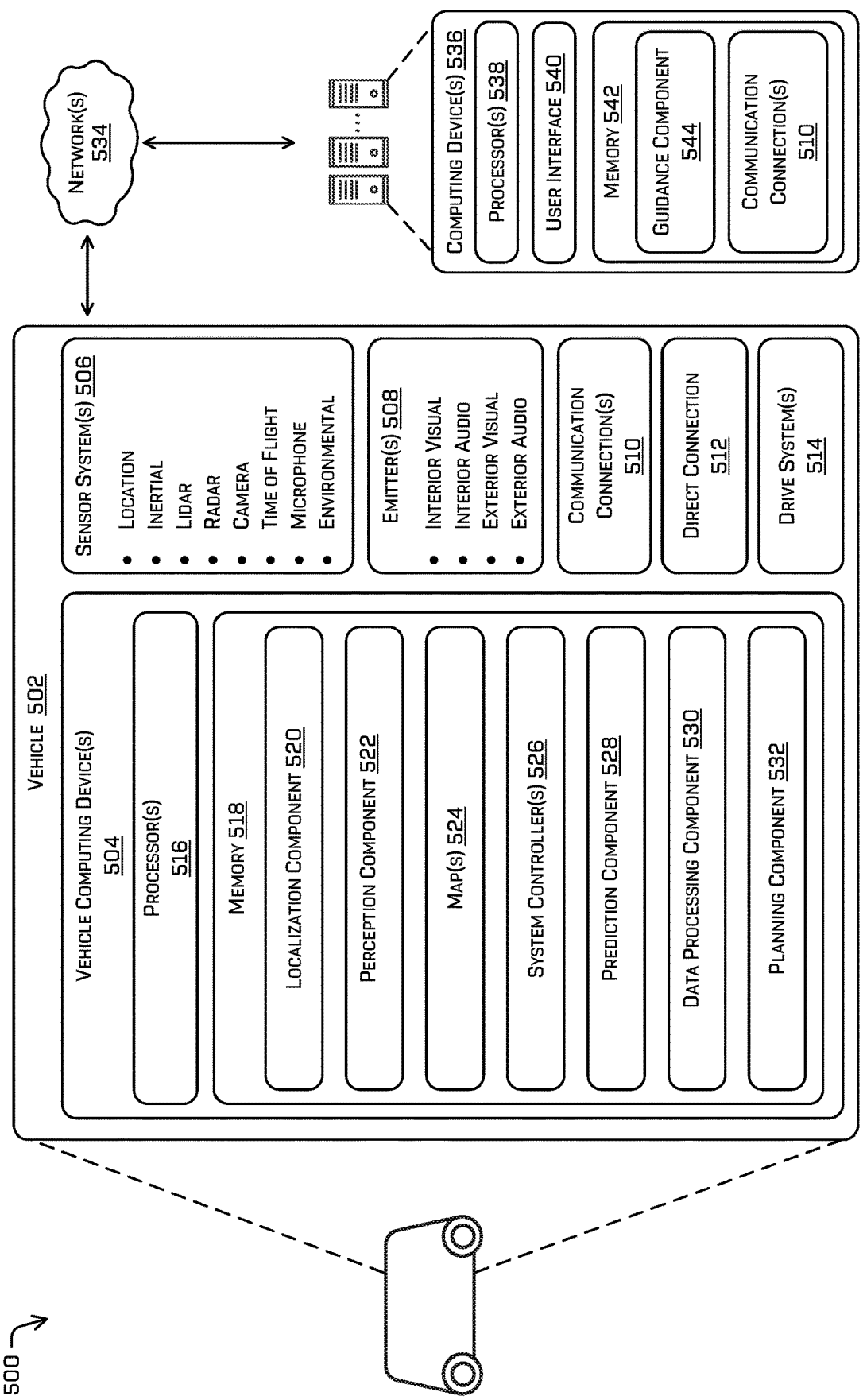
FIG. 5 depicts a block diagram of an example system for implementing the techniques described herein.

FIG. 5 depicts a block diagram of an example system 500 for implementing the techniques described herein. In at least one example, the system 500 can include a vehicle 502, which can correspond to the autonomous vehicle 202 of FIG. 2.

The example vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a prediction component 528, a data processing component 530, and a planning component 532. Though depicted in FIG. 5 as residing in the memory 518 for illustrative purposes, it is contemplated that the localization component 520, the perception component 522, the one or more maps 524, the one or more system controllers 526, the prediction component 528, the data processing component 530, and the planning component 532 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for determining that an object is proximate to one or more crosswalk regions and/or for identifying candidate reference lines, as discussed herein.

In some instances, and in general, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 524 can include at least one map (e.g., images and/or a mesh).

In some examples, the vehicle 502 can be controlled based at least in part on the maps 524. That is, the maps 524 can be used in connection with the localization component 520, the perception component 522, the prediction component 528, and/or the planning component 532 to determine a location of the vehicle 502, identify objects in an environment, and/or generate routes and/or trajectories to navigate within an environment.

In some examples, the one or more maps 524 can be stored on a remote computing device(s) (such as the computing device(s) 536) accessible via network(s) 534. In some examples, multiple maps 524 can be stored based on, for example, a characteristic (e.g., type of entity, time of day, day of week, season of the year, etc.). Storing multiple maps 524 can have similar memory requirements, but can increase the speed at which data in a map can be accessed.

In at least one example, the vehicle computing device(s) 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

In general, the prediction component 528 can include functionality to generate predicted information associated with objects in an environment. In some examples, the prediction component 528 can be implemented to predict locations of a pedestrian proximate to a crosswalk region (or otherwise a region or location associated with a pedestrian crossing a road) in an environment as they traverse or prepare to traverse through the crosswalk region. In some examples, the techniques discussed herein can be implemented to predict locations of objects (e.g., a vehicle, a pedestrian, and the like) as the vehicle traverses an environment. In some examples, the prediction component 528 can generate one or more predicted trajectories for such target objects based on attributes of the target object and/or other objects proximate the target object.

The data processing component 530 can include functionality to determine a cost associated with a trajectory from the planning component 532, determine whether the cost meets or exceeds a threshold cost, and determining whether to send a request for assistance based at least in part on the cost meeting or exceeding the threshold cost. associated with objects in an environment. In some examples, the data processing component 530 can receive data from the localization component 520, the perception component 522, and/or the planning component 532 to determine a threshold (e.g., an acceleration threshold, a velocity threshold, and/or a timing threshold) and/or a capability associated with the vehicle 502. The data processing component 530 can include functionality to receive information indicating a cost, a threshold, or other data from the computing device 536 and use the information during planning operations.

In general, the planning component 532 can determine a path for the vehicle 502 to follow to traverse the environment. For example, the planning component 532 can determine various routes and trajectories and various levels of detail. For example, the planning component 532 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 532 can generate an instruction for guiding the autonomous vehicle along at least a portion of the route from the first location to the second location. In at least one example, the planning component 532 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 532 can generate one or more trajectories for the vehicle 502 based at least in part on predicted location(s) associated with object(s) in an environment. In some examples, the planning component 532 can use temporal logic, such as linear temporal logic and/or signal temporal logic, to evaluate one or more trajectories of the vehicle 502.

As can be understood, the components discussed herein (e.g., the localization component 520, the perception component 522, the one or more maps 524, the one or more system controllers 526, the prediction component 528, the data processing component 530, and the planning component 532) are described as divided for illustrative purposes. However, the operations performed by the various components can be combined or performed in any other component. Further, any of the components discussed as being implemented in software can be implemented in hardware, and vice versa. Further, any functionality implemented in the vehicle 502 can be implemented in the computing device(s) 536, or another component (and vice versa).

In at least one example, the sensor system(s) 506 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the time of flight sensors can include individual time of flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 534, to the one or more computing device(s) 536 at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 534. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more maps 524, the one or more system controllers 526, the prediction component 528, the data processing component 530, and the planning component 532 can process sensor data, as described above, and can send their respective outputs, over the one or more network(s) 534, to one or more computing device(s) 536. In at least one example, the localization component 520, the one or more maps 524, the one or more system controllers 526, the prediction component 528, the data processing component 530, and the planning component 532 can send their respective outputs to the one or more computing device(s) 536 at a particular frequency, after a lapse of a predetermined period of time, in near real-time, etc.

In some examples, the vehicle 502 can send sensor data to one or more computing device(s) 536 via the network(s) 534. In some examples, the vehicle 502 can send raw sensor data to the computing device(s) 536. In other examples, the vehicle 502 can send processed sensor data and/or representations of sensor data to the computing device(s) 536. In some examples, the vehicle 502 can send sensor data to the computing device(s) 536 at a particular frequency, after a lapse of a predetermined period of time, in near real-time, etc. In some cases, the vehicle 502 can send sensor data (raw or processed) to the computing device(s) 536 as one or more log files.

The computing device(s) 536 can include processor(s) 538, a user interface 540, and a memory 542 storing guidance component 544 and communication connection(s) 510. In some examples, the user interface 540 can include functionality to generate maps of various resolutions and/or output a representation of the vehicle navigating in an environment. The user interface 540 can further include functionality to provide one or more controls that receive an input to guide the vehicle 502 (by way of determining a reference trajectory, for instance). In some examples, the input to the user interface 540 can indicate a velocity and a direction for the vehicle 502 to follow at a future time.

In some examples, the input to the user interface 540 can be received via a steering controller or an acceleration controller in communication with the user interface 540. For instance, the steering controller may comprise a steering wheel or other interface configured to control steering as part of the input. In some examples, an acceleration controller may comprise an acceleration pedal, a brake pedal, or other interface configured to control acceleration as part of the input. In some examples, a single controller can provide steering, acceleration, and braking control inputs to the user interface.

The guidance component 544 can include functionality to determine an instruction and transmit the instruction to the vehicle 502 via the network 534. For instance, the guidance component 544 can be configured to generate and/or determine a potential trajectory (e.g., reference trajectory 306 in FIG. 3) for the vehicle 502 based at least in part on one or more inputs received from the user interface 540. In various examples, the instruction may comprise an indication of a velocity and a direction usable by the planning component 532 to generate one or more predicted trajectories for the vehicle 502 (e.g., direction of travel, speed, etc.). In some examples, the guidance component 544 may be configured to determine one or more available trajectories for the vehicle 502 to follow that avoids an event that may prevent the autonomous vehicle 202 from navigating to a destination in the environment. Additionally, or alternatively the guidance component 544 may be configured to transmit the one or more available trajectories to the vehicle 502 for the vehicle to consider in planning consideration. In some examples, the guidance component 544 may be configured to determine trajectories that are applicable to the environment, such as based on vehicle characteristics, environment characteristics, weather characteristics, or the like.

The guidance component 544 can also include functionality to determine a movement threshold associated with limiting movement of a representation of the vehicle in the user interface 540 based at least in part on a capability of the vehicle 502 to move in an environment. For example, as discussed herein, the input to navigate the representation of the vehicle (e.g., vehicle representation 304A of FIG. 3) may be based at least in part on at least one of a rate control, a steering capability, or an acceleration capability of the vehicle to navigate in the environment.

In some examples, guidance component 544 can include functionality to receiving sensor data from the perception component 522 and determine, based at least in part on the sensor data, at least one of: an acceleration threshold, a velocity threshold, or a timing threshold for a representation of the vehicle to navigate in a user interface on a display device. In such examples, one or more reference trajectories determined by the guidance component 544 may be based at least in part on the acceleration threshold, the velocity threshold, or the timing threshold.

In some instances, aspects of some or all of the components discussed herein may include any models, techniques, and/or machine learned techniques. For example, in some instances, the components in the memory 518 (and the memory 542) may be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 516 of the vehicle 502 and the processor(s) 538 of the computing device(s) 536 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 536 and/or components of the computing device(s) 536 can be associated with the vehicle 502. That is, the vehicle 502 can perform one or more of the functions associated with the computing device(s) 536, and vice versa. Further, aspects of the prediction component 528 (and subcomponents) can be performed on any of the devices discussed herein.

Figure 6:
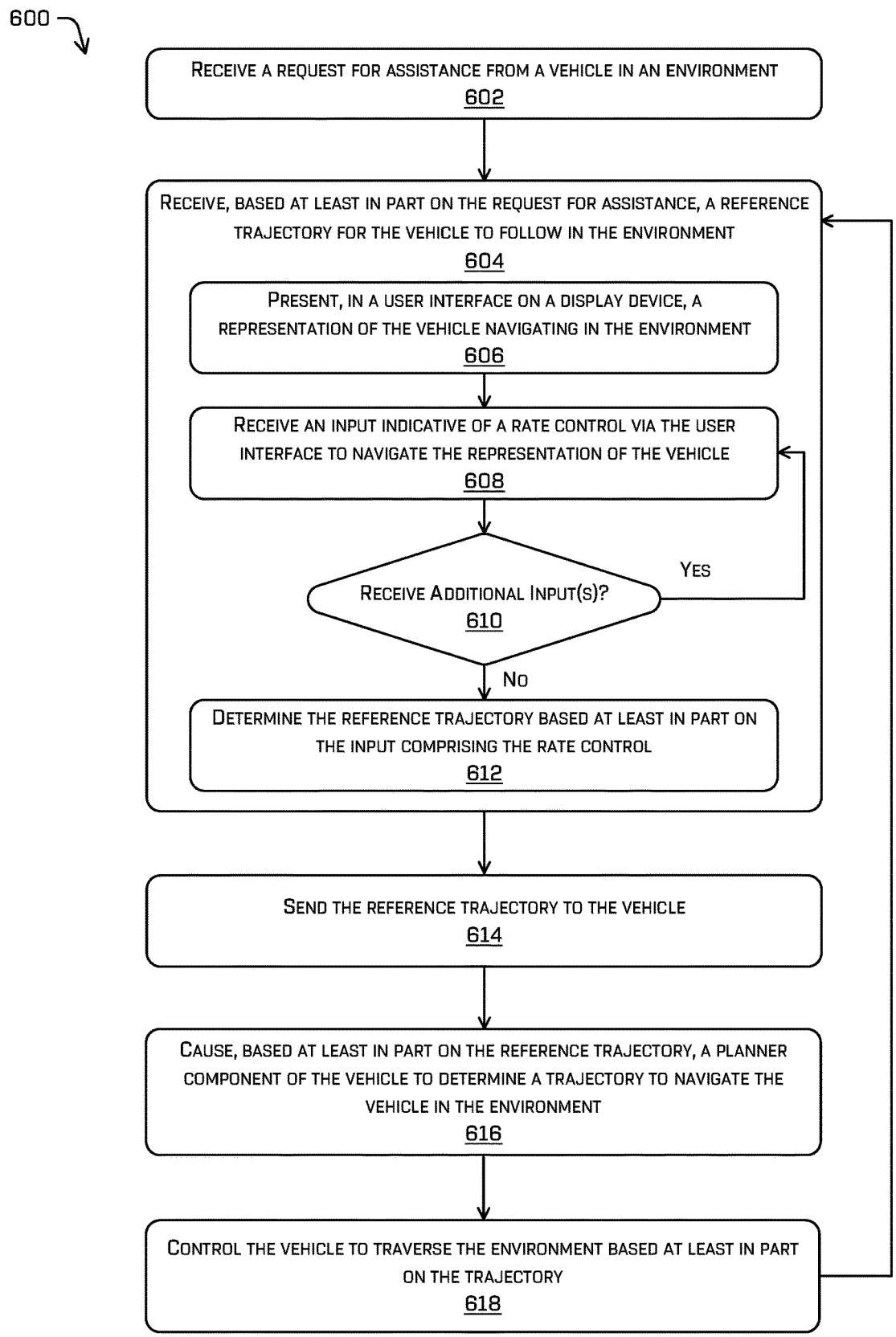
FIG. 6 is a flowchart depicting an example process for sending a reference trajectory to a vehicle to guide the vehicle.

FIG. 6 is a flowchart depicting an example process 600 for sending a reference trajectory to a vehicle to guide the vehicle. Some or all of the process 600 may be performed by one or more components in FIG. 5, as described herein. For example, some or all of process 600 may be performed by the computing device 536. Further, any of the operations described in the example process 600 may be executed in parallel, in a different order than depicted in the process 600, omit any of the operations of the depicted process 600, and/or be combined with any of the operations discussed herein.

At operation 602, the process can include receiving a request for assistance from a vehicle in an environment. In some examples, the operation 602 can include receiving data such as vehicle state data and/or sensor data (e.g., time of flight data, lidar data, image data, radar data, and the like, of the environment). In some examples, the operation 602 can be performed by a vehicle (e.g., an autonomous vehicle) as the vehicle traverses the environment.

At operation 604, the process can include receiving, based at least in part on the request for assistance, a reference trajectory for the vehicle to follow in the environment. For example, the operation 604 can include presenting, in a user interface on a display device, a representation of the vehicle navigating in the environment (operation 606) and receiving an input indicative of a rate control via the user interface to navigate the representation of the vehicle (operation 608). In some examples, the rate control associated with the input controls a rate of acceleration associated with an acceleration control and a rate of steering associated with a steering control. In such examples, the acceleration control and/or the steering control may represent a control configured to provide an acceleration and/or a steering input by a teleoperator to the user interface). In some examples, the input to navigate the representation of the vehicle may be based at least in part on at least one of a steering capability or an acceleration capability of the vehicle to navigate in the environment.

If an additional input is received (e.g., "yes" in operation 610), the process can return to the operation 608. However, in some examples, the process can continue to operation 612 where a reference trajectory can be determined based at least in part on the one or more inputs to the user interface.

If an additional input is not received (e.g., "no" in the operation 610), the process continues to operation 612. At the operation 612, the reference trajectory can be generated based on the input(s) comprising rate control(s) that navigated the representation of the vehicle. In some examples, the reference trajectory may indicate position, direction, acceleration, velocity, and/or braking information. In some examples, the information indicated by the reference trajectory In various examples, the reference trajectory may be based on movements and/or capabilities of the vehicle in the environment. In some examples, the operation 612 can include determining a reference cost, a steering cost, an acceleration cost, and/or an obstacle cost (e.g., likelihood of colliding with an object) associated with the reference trajectory.

At operation 614, the process can include sending the reference trajectory to the vehicle. In various examples, the operation 614 can include sending the reference cost, the steering cost, the acceleration cost, or the obstacle cost associated with the reference trajectory. In various examples, information associated with the rate control (e.g., acceleration, steering, braking rates used to generate the reference trajectory) may be included as part of the reference trajectory that is sent to the vehicle. In some examples, the reference trajectory may be sent to an additional vehicle, such as a different autonomous vehicle in a fleet of autonomous vehicles. In some examples, the reference trajectory may be stored and/or associated with in a data store accessible by the vehicle and/or the additional vehicle. In such examples, the data store may comprise a map that is accessible and updatable to identify an event impacting one or more vehicle. In various examples, a computing device (e.g., the computing device 204) may send the reference trajectory to the additional vehicle based at least in part on a position of the additional vehicle relative to the map.

At operation 616, the process can include causing, based at least in part on the reference trajectory, a planning component of the vehicle to determine a trajectory to navigate the vehicle in the environment. For instance, the planning component of the vehicle may determine a candidate trajectory based at least in part on the reference cost, the steering cost, the acceleration cost, or the obstacle cost associated with the reference trajectory. In some examples, the candidate trajectory may be determined by the planning component with consideration to the rate control used to determine the reference trajectory. In various examples, the planning component may determine the candidate trajectory based at least in part on acceleration and/or steering information (e.g., an acceleration rate, an acceleration control, a steering rate, a steering control, and the like).

At operation 618, the process can include controlling the vehicle to traverse the environment based at least in part on the trajectory. In some examples, the trajectory may guide the vehicle while an additional input is being provided to generate a second reference trajectory. In such examples, the second reference trajectory may be sent to the vehicle, and be usable by the vehicle to generate an additional trajectory that is based on both the first reference trajectory and the second reference trajectory. In some examples, the first reference trajectory and the second reference trajectory may be associated with a same event in the environment while in other examples, the first reference trajectory and the second reference trajectory may be associated with different events in the environment. In some examples, a first event may be associated with a first vehicle while the second event may be associated with the first vehicle and/or a second vehicle different from the first vehicle. This continuous operation is illustrated by the operations continuing from the operation 618 to the operation 604.

Figure 7:
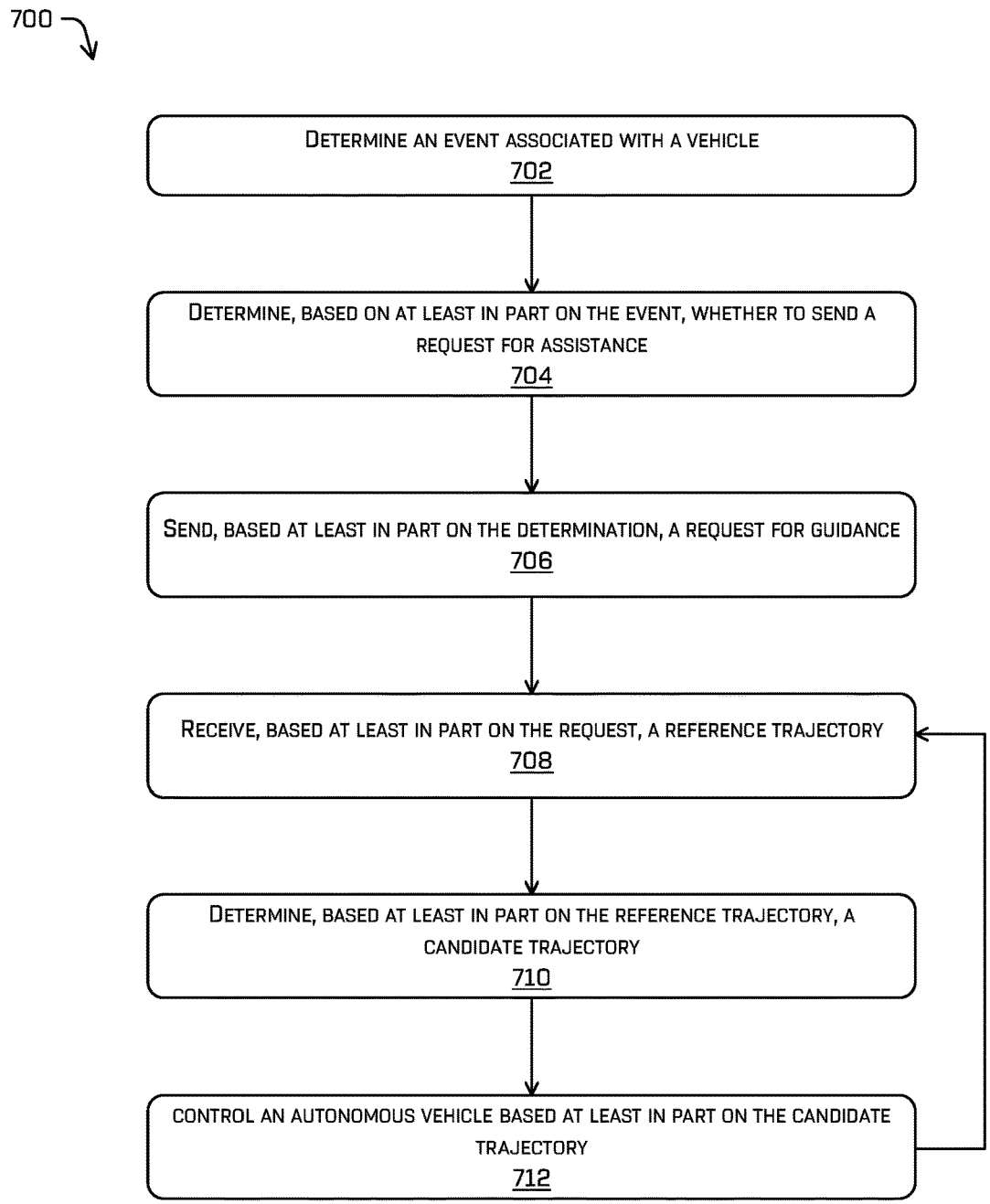
FIG. 7 is a flowchart depicting an example process for determining a candidate trajectory for a vehicle based on a reference trajectory.

FIG. 7 is a flowchart depicting an example process 700 for sending a reference trajectory to a vehicle to guide the vehicle. Some or all of the process 700 may be performed by one or more components in FIG. 5, as described herein. For example, some or all of process 700 may be performed by the vehicle computing device 504. Further, any of the operations described in the example process 700 may be executed in parallel, in a different order than depicted in the process 700, omit any of the operations of the depicted process 700, and/or be combined with any of the operations discussed herein.

At operation 702, the process can include determining an event associated with a vehicle navigating in an environment. In some examples, the operation 702 can include determining, by a planning component and/or a perception component of an autonomous vehicle, that the event (e.g., a blocked region, and so on) will impact operation of the vehicle during navigation.

At operation 704, the process can include determining whether to send a request for assistance. In some examples, the operation 704 can include determining, by a planning component of an autonomous vehicle, a reference trajectory for a vehicle to follow. Here, the reference trajectory determined by the vehicle represents guidance autonomously determined by the vehicle. In some examples, the operation 704 can include determining a cost associated with the reference trajectory and determining that the cost meets or exceeds a threshold cost. In some examples, the operation 704 can be performed by a vehicle (e.g., an autonomous vehicle) as the vehicle traverses the environment in accordance with the reference trajectory determined by the planning component of the vehicle.

In some examples, the operation 704 can include detecting an object in the environment and determining that the object impacts an ability of the vehicle to navigate to a destination. The operation may also or instead include determining a confidence level associated with the ability of the vehicle to navigate to the destination. For instance, the vehicle may detect the event (an obstacle, a person directing traffic, and so on) and determine a confidence level associated with the reference trajectory to navigate the vehicle in view of the event. In some examples, the confidence level may be used to determine whether to send the request for assistance.

At operation 706, the process can include sending, based at least in part on the determination, a request for guidance.

For example, the operation 706 can include sending data, a threshold, a capability, and/or a confidence level associated with the vehicle to a remote computing device.

At operation 708, the process can include receiving, based at least in part on the request, a reference trajectory. For example, the remote computing device may determine and send the reference trajectory to the vehicle. In some examples the reference trajectory is determined based at least in part on the data, the threshold, the capability, and/or the confidence level sent from the vehicle. In various examples, the reference trajectory may be based at least in part on at least one of a rate-controlled acceleration input or a rate-controlled steering input. Note that the reference trajectory determined by the remote computing device (operation 708) is different from the reference trajectory determined by the vehicle computing device (operation 704) currently used by the vehicle to navigate in the environment.

At operation 710, the process can include determining, based at least in part on the reference trajectory determined by the remote computing device, a candidate trajectory. For example, the vehicle computing device may determine the candidate trajectory for the vehicle to navigate in view of the event. For instance, the planning component of the vehicle may determine a candidate trajectory based at least in part on one or more costs associated with the reference trajectory. In some examples, the candidate trajectory may be determined by the planning component with consideration to a rate control used to determine the reference trajectory. In various examples, the planning component may determine the candidate trajectory based at least in part on acceleration and/or steering information associated with the reference trajectory.

At operation 712, the process can include controlling an autonomous vehicle based at least in part on the candidate trajectory. For example, the vehicle computing device may implement the candidate trajectory in place of the current reference trajectory to navigate the vehicle past the event. This continuous operation is illustrated by the operations continuing from the operation 712 to the operation 708.

Example Clauses

A: A system comprising: one or more processors; and one or more non-transitory computer-readable media storing instructions executable by the one or more processors, wherein the instructions, when executed, cause the system to perform operations comprising: receiving a request for assistance from an autonomous vehicle navigating in an environment, the request for assistance comprising vehicle state data associated with the autonomous vehicle and sensor data associated with the autonomous vehicle; receiving an input indicative of a rate control; determining, based at least in part on the rate control, a reference trajectory for the autonomous vehicle to follow in the environment, wherein the reference trajectory indicates a velocity and a direction for the autonomous vehicle to navigate in the environment at a future time; and sending the reference trajectory to the autonomous vehicle, wherein the reference trajectory is configured to cause a planning component of the autonomous vehicle to determine a trajectory to navigate the autonomous vehicle in the environment.

B: The system of paragraph A, the operations further comprising: presenting, via a user interface on a display device, a representation of the autonomous vehicle navigating in the environment; receiving the input comprising the rate control via the user interface to navigate the representation of the autonomous vehicle; and determining the reference trajectory based at least in part on the input.

C: The system of paragraph A or B, wherein the input to navigate the representation of the autonomous vehicle is based at least in part on at least one of kinematic or dynamic constraints of the autonomous vehicle.

D: The system of any of paragraphs A-C, wherein the rate control is configured to adjust an acceleration rate or a steering rate of the input based at least in part on the vehicle state data, and the operations further comprising: causing a display to present, based at least in part on the vehicle state data, a representation of the autonomous vehicle in a user interface at a first position, the first position associated with a current position of the autonomous vehicle in the environment associated with a first time; determining the reference trajectory based at least in part on receiving the input to control the representation of the autonomous vehicle in accordance with the acceleration rate or the steering rate, the input indicating a velocity and a direction for the autonomous vehicle to navigate in the environment at a second time after the first time; and sending, to the autonomous vehicle, an indication of the acceleration rate or the steering rate associated with the reference trajectory.

E: The system of any of paragraphs A-D, the operations further comprising: determining, based at least in part on the sensor data, one or more of an object or an event in the environment proximate the autonomous vehicle; and determining at least one of an acceleration threshold, a velocity threshold, or a timing threshold for a representation of the autonomous vehicle to navigate in a user interface on a display device based at least in part on the object or the event; wherein the reference trajectory is based at least in part on the at least one of the acceleration threshold, the velocity threshold, or the timing threshold.

F: A method comprising: receiving a request for assistance from a vehicle in an environment; receiving an input indicative of a rate control; determining, based at least in part on the rate control, a reference trajectory for the vehicle to follow in the environment, wherein the reference trajectory indicates a velocity of the vehicle and a direction for the vehicle to navigate in the environment at a future time; and sending the reference trajectory to the vehicle; wherein the reference trajectory is configured to cause a planning component of the vehicle to determine a trajectory to navigate the vehicle in the environment.

G: The method of paragraph F, further comprising: presenting, via a user interface on a display device, a representation of the vehicle navigating in the environment; receiving an input via the user interface to navigate the representation of the vehicle; and determining the reference trajectory based at least in part on the input.

H: The method of paragraph F or G, wherein the input to navigate the representation of the vehicle is based at least in part on a capability of the vehicle to navigate in the environment.

I: The method of any of paragraphs F-H, wherein the input to navigate the representation of the vehicle causes a simulation of the representation of the vehicle in the user interface, wherein the simulation is based at least in part on one or more movement limitations associated with the vehicle traversing the environment.

J: The method of paragraph F-I, further comprising: causing a display device to present a current position of the vehicle and a representation of the vehicle in a user interface; receiving a first input representative of a suggested trajectory for the representation of the vehicle; and causing the display device to present the suggested trajectory of the vehicle in the user interface relative to the current position of the vehicle; wherein determining the reference trajectory or the vehicle is further based at least in part on the suggested trajectory.

K: The method of paragraph F-J, further comprising: determining, based at least in part on sensor data received from the vehicle, one or more of an object or an event in the environment proximate the vehicle; and determining at least one of an acceleration threshold, a velocity threshold, or a timing threshold for the representation of the vehicle to navigate in the user interface based at least in part on the object or the event; wherein the reference trajectory is based at least in part on the at least one of the acceleration threshold, the velocity threshold, or the timing threshold.

L: The method of any of paragraphs F-K, further comprising associating the reference trajectory with a data store accessible by an additional vehicle.

M: The method of any of paragraphs F-L, wherein the data store comprises a map, the method further comprising sending the reference trajectory to the additional vehicle based at least in part on a position of the additional vehicle relative to the map.

N: The method of any of paragraphs F-M, wherein the rate control is configured to adjust an acceleration rate or a steering rate of the input based at least in part on vehicle state data received from the vehicle, and further comprising: determining, based at least in part on the acceleration rate or the steering rate, the reference trajectory to control a representation of the vehicle in a user interface on a display device; and sending, to the vehicle, an indication of the acceleration rate or the steering rate associated with the reference trajectory; wherein the reference trajectory indicating the acceleration rate or the steering rate is configured to cause a planning component of the vehicle to determine a trajectory to navigate the vehicle in the environment.

O: The method of any of paragraphs F-N, further comprising: presenting, via a user interface on a display device, a first representation of the vehicle controllable by an input from a remote device, and a second representation of the vehicle indicating an action or a direction of the vehicle in the environment.

P: The method of any of paragraphs F-O, further comprising: receiving vehicle state data associated with the vehicle; and updating a location of the first representation of the vehicle in the user interface based at least in part on the vehicle state data.

Q: One or more non-transitory computer-readable media storing instructions that, when executed, cause one or more processors to perform operations comprising: receiving a request for assistance from a vehicle in an environment; receiving an input indicative of a rate control; determining, based at least in part on the rate control, a reference trajectory for the vehicle to follow in the environment, wherein the reference trajectory indicates a velocity of the vehicle and a direction for the vehicle to navigate in the environment at a future time; sending the reference trajectory to the vehicle; and causing, based at least in part on the reference trajectory, a planning component of the vehicle to determine a trajectory to navigate the vehicle in the environment.

R: The one or more non-transitory computer-readable media of paragraph Q, the operations further comprising: presenting, via a user interface on a display device, a representation of the vehicle navigating in the environment; receiving the input comprising the rate control via the user interface to navigate the representation of the vehicle; and determining the reference trajectory based at least in part on the input.

S: The one or more non-transitory computer-readable media of paragraph Q or R, wherein the input to navigate the representation of the vehicle is based at least in part on a steering capability or an acceleration capability of the vehicle to navigate in the environment.

T: The one or more non-transitory computer-readable media of any of paragraphs Q-S, the operations further comprising: determining, based at least in part on sensor data, one or more of an object or an event in the environment proximate the vehicle; and determining at least one of an acceleration threshold, a velocity threshold, or a timing threshold for a representation of the vehicle to navigate in a user interface on a display device based at least in part on the object or the event; wherein the reference trajectory is based at least in part on the at least one of the acceleration threshold, the velocity threshold, or the timing threshold.

U: A system comprising: one or more processors; and one or more non-transitory computer-readable media storing instructions executable by the one or more processors, wherein the instructions, when executed, cause the system to perform operations comprising: determining, by a planning component of an autonomous vehicle, a first reference trajectory; determining an event associated with the first reference trajectory; sending, based at least in part on the event, a request for guidance to a remote computing device; receiving, based at least in part on the request and from the remote computing device, a second reference trajectory, wherein the second reference trajectory comprises at least one of steering data or acceleration data; determining, based at least in part on the second reference trajectory, a candidate trajectory; and controlling the autonomous vehicle based at least in part on the candidate trajectory.

V: The system of paragraph U, the operations further comprising: receiving sensor data of an environment captured by a sensor of the autonomous vehicle, the sensor data associated with a first time; and sending the sensor data to the remote computing device; wherein the second reference trajectory is based at least in part on the sensor data and indicates an acceleration for the autonomous vehicle and a steering for the autonomous vehicle to navigate in the environment at a second time after the first time.

W: The system of paragraphs U or V, wherein the second reference trajectory is based at least in part on a capability of the autonomous vehicle to navigate in an environment, wherein the capability of the autonomous vehicle is based at least in part on kinematic information or dynamic information associated with the autonomous vehicle.

X: The system of any of paragraphs U-W, wherein the second reference trajectory is based at least in part on at least one of a rate-controlled acceleration input or a rate-controlled steering input.

Y: The system of any of paragraphs U-X, the operations further comprising: receiving, from the autonomous vehicle, sensor data indicating an object in an environment of the autonomous vehicle; and determining, based at least in part on the sensor data and the object, at least one of an acceleration threshold, a velocity threshold, or a timing threshold associated with the autonomous vehicle to navigate in a user interface; wherein the request for guidance comprises the acceleration threshold, the velocity threshold, and the timing threshold; and wherein the second reference trajectory is determined based at least in part on the at least one of the acceleration threshold, the velocity threshold, or the timing threshold.

Z: A method comprising: sending a request for guidance from a vehicle navigating in an environment; receiving, from a remote computing device and based at least in part on the request for guidance, a reference trajectory for the vehicle to follow in the environment, wherein the reference trajectory indicates an acceleration of the vehicle and steering for the vehicle to navigate in the environment at a future time; and determining, by a planning component of the vehicle and based at least in part on the reference trajectory, a trajectory to navigate the vehicle in the environment.

AA: The method of paragraph Z, wherein the reference trajectory is based at least in part on at least one of a rate-controlled acceleration input or a rate-controlled steering input.

AB: The method of paragraphs Z or AA, wherein: the rate-controlled acceleration input is based at least in part on an acceleration capability associated with navigating the vehicle in the environment; and the rate-controlled steering input is based at least in part on a steering capability associated with navigating the vehicle in the environment.

AC: The method of any of paragraphs Z-AB, wherein the reference trajectory is a second reference trajectory, the method further comprising: determining, by the planning component of the vehicle and prior to sending the request, a first reference trajectory; determining a cost associated with the first reference trajectory; and determining the cost meets or exceeds a threshold cost; wherein sending the request for guidance is based at least in part on the cost meeting or exceeding the cost threshold.

AD: The method of any of paragraphs Z-AC, wherein determining the trajectory is further based at least in part on at least one of a reference cost, a steering cost, an acceleration cost, or an obstacle cost associated with the reference trajectory.

AE: The method of any of paragraphs Z-AD, further comprising: determining a rate-control threshold for use by the remote computing device based at least in part on sensor data associated with the vehicle; and sending, to the remote computing device, the rate-control threshold to cause the reference trajectory to be determined based at least in part on the rate-control threshold.

AF: The method of any of paragraphs Z-AE, wherein the reference trajectory comprises an acceleration rate and a steering rate, the method further comprising: determining, based at least in part on the acceleration rate associated with the reference trajectory, an acceleration cost for the trajectory to navigate the vehicle; determining, based at least in part on the steering rate associated with the reference trajectory, a steering cost for the trajectory to navigate the vehicle; and navigating the vehicle in the environment based at least in part on the acceleration cost and the steering cost.

AG: The method of any of paragraphs Z-AF, wherein the event comprises at least one of a potential collision, an obstacle, or a road closure.

AH: The method of any of paragraphs Z-AG, further comprising: receiving sensor data of the environment captured by a sensor of the vehicle; and sending the sensor data to the remote computing device, wherein the reference trajectory is based at least in part on the sensor data.

AI: The method of any of paragraphs Z-AH, further comprising: detecting an event in the environment based at least in part on sensor data captured from a sensor of the vehicle; and determining that the event impacts an ability of the vehicle to navigate to a destination, wherein: sending the request for guidance comprises sending a confidence level associated with the ability of the vehicle to navigate to the destination, and the reference trajectory is based at least in part on the confidence level.

AJ: The method of any of paragraphs Z-AI, wherein the reference trajectory is based at least in part on one or more of a kinematic or a dynamic constraint of the vehicle to navigate in the environment.

AK: One or more non-transitory computer-readable media storing instructions that, when executed, cause one or more processors to perform operations comprising: sending a request for guidance from a vehicle navigating in an environment; receiving, from a remote computing device and based at least in part on the request for guidance, a reference trajectory for the vehicle to follow in the environment, wherein the reference trajectory indicates an acceleration of the vehicle and steering for the vehicle to navigate in the environment at a future time; and determining, by a planning component of the vehicle and based at least in part on the reference trajectory, a trajectory to navigate the vehicle in the environment.

AL: The one or more non-transitory computer-readable media of paragraph AK, wherein the reference trajectory is based at least in part on at least one of a rate-controlled acceleration input or a rate-controlled steering input.

AM: The one or more non-transitory computer-readable media of paragraph AK or AL, wherein the reference trajectory is based at least in part on a kinematic or a dynamic constraint of the vehicle to navigate in the environment.

AN: The one or more non-transitory computer-readable media of paragraphs AK-AM, wherein determining the trajectory is further based at least in part on at least one of a reference cost, a steering cost, an acceleration cost, or an obstacle cost associated with the reference trajectory.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
determining, by a planning component of an autonomous vehicle, a first reference trajectory;
determining an event associated with the first reference trajectory;
determining a cost associated with the first reference trajectory;
determining if the cost meets or exceeds a cost threshold;
sending, based at least in part on the event and the cost meeting or exceeding the cost threshold, a request for guidance to a remote computing device, wherein the request for guidance comprises a confidence level associated with the first reference trajectory;
receiving, based at least in part on the request and from the remote computing device, a second reference trajectory, wherein the second reference trajectory is determined based at least in part on the confidence level;
generating, based at least in part on the first reference trajectory, the cost, and the second reference trajectory, a candidate trajectory; and
controlling the autonomous vehicle based at least in part on the candidate trajectory.

2. The system of claim 1, the operations further comprising:
receiving sensor data of an environment captured by a sensor of the autonomous vehicle, the sensor data associated with a first time; and
sending the sensor data to the remote computing device;
wherein the second reference trajectory is based at least in part on the sensor data and indicates an acceleration for the autonomous vehicle and a steering for the autonomous vehicle to navigate in the environment at a second time after the first time.

3. The system of claim 1, wherein the second reference trajectory is based at least in part on a capability of the autonomous vehicle to navigate in an environment, wherein the capability of the autonomous vehicle is based at least in part on kinematic information or dynamic information associated with the autonomous vehicle.

4. The system of claim 1, wherein the second reference trajectory is based at least in part on at least one of a rate-controlled acceleration input or a rate-controlled steering input.

5. The system of claim 1, the operations further comprising:
receiving, from the autonomous vehicle, sensor data indicating an object in an environment of the autonomous vehicle; and
determining, based at least in part on the sensor data and the object, at least one of an acceleration threshold, a velocity threshold, or a timing threshold associated with the autonomous vehicle navigating through the environment;
wherein the request for guidance comprises at least one of the acceleration threshold, the velocity threshold, or the timing threshold; and
wherein the second reference trajectory is determined based at least in part on the at least one of the acceleration threshold, the velocity threshold, or the timing threshold.

6. A method comprising:
determining, by a planning component of a vehicle, a first reference trajectory;
determining an event associated with the first reference trajectory;
determining a cost associated with the first reference trajectory;
determining if the cost meets or exceeds a cost threshold;
sending, based at least in part on the event and on the cost meeting or exceeding the cost threshold, a request for guidance from the vehicle navigating in an environment to a remote computing device, wherein the request for guidance comprises a confidence level associated with the first reference trajectory;
receiving, from the remote computing device and based at least in part on the request for guidance, one or more second reference trajectories for the vehicle to follow in the environment, wherein at least one of the one or more second reference trajectories is determined based at least in part on the confidence level;
generating, by the planning component of the vehicle and based at least in part on the first reference trajectory, the cost, and the one or more second reference trajectories, a trajectory to navigate the vehicle in the environment, wherein the trajectory is different from the first reference trajectory and the one or more second reference trajectories received from the remote computing device; and
controlling the vehicle based at least in part on the trajectory.

7. The method of claim 6, wherein at least one of the one or more second reference trajectories is based at least in part on at least one of a rate-controlled acceleration input or a rate-controlled steering input.

8. The method of claim 7, wherein:
the rate-controlled acceleration input is based at least in part on an acceleration capability associated with navigating the vehicle in the environment; and
the rate-controlled steering input is based at least in part on a steering capability associated with navigating the vehicle in the environment.

9. The method of claim 6, wherein determining the trajectory is further based at least in part on at least one of a reference cost, a steering cost, an acceleration cost, or an obstacle cost associated with at least one of the one or more second reference trajectories.

10. The method of claim 6, further comprising:
determining a rate-control threshold for use by the remote computing device based at least in part on sensor data associated with the vehicle; and
sending, to the remote computing device, the rate-control threshold to cause at least one of the one or more second reference trajectories to be determined based at least in part on the rate-control threshold.

11. The method of claim 6, wherein at least one of the one or more second reference trajectories comprises an acceleration rate and a steering rate, the method further comprising:
determining, based at least in part on the acceleration rate associated with the one of the one or more second reference trajectories, an acceleration cost for the trajectory to navigate the vehicle;
determining, based at least in part on the steering rate associated with the one of the one or more second reference trajectories, a steering cost for the trajectory to navigate the vehicle; and navigating the vehicle in the environment based at least in part on the acceleration cost and the steering cost.

12. The method of claim 6, the method further comprising: determining an event, wherein the request for guidance is based at least in part on the event, wherein the event comprises at least one of a potential collision, an obstacle, or a road closure.

13. The method of claim 6, further comprising:
receiving sensor data of the environment captured by a sensor of the vehicle; and
sending the sensor data to the remote computing device, wherein at least one of the one or more second reference trajectories is based at least in part on the sensor data.

14. The method of claim 6, further comprising:
detecting an event in the environment based at least in part on sensor data captured from a sensor of the vehicle; and
determining that the event impacts an ability of the vehicle to navigate to a destination,
wherein:
sending the request for guidance comprises sending the confidence level associated with the ability of the vehicle to navigate to the destination, and
the at least one of the one or more second reference trajectories is based at least in part on the confidence level.

15. The method of claim 6, wherein at least one of the one or more second reference trajectories is based at least in part on one or more of a kinematic or a dynamic constraint of the vehicle to navigate in the environment.

16. One or more non-transitory computer-readable media storing instructions that, when executed, cause one or more processors to perform operations comprising:
determining, by a planning component of a vehicle, a first reference trajectory;
determining a cost associated with the first reference trajectory;
determining if the cost meets or exceeds a cost threshold;
sending, based at least in part on the cost meeting or exceeding the cost threshold, a request for guidance from the vehicle navigating in an environment, wherein the request for guidance comprises a confidence level associated with the first reference trajectory;
receiving, from a remote computing device and based at least in part on the request for guidance, a second reference trajectory for the vehicle to follow in the environment, wherein the second reference trajectory is determined based on at least in part on the confidence level;
generating, by the planning component of the vehicle and based at least in part on the first reference trajectory, the cost, and the second reference trajectory, a trajectory to navigate the vehicle in the environment; and
controlling the vehicle based at least in part on the trajectory.

17. The one or more non-transitory computer-readable media of claim 16, wherein the second reference trajectory is based at least in part on at least one of a rate-controlled acceleration input or a rate-controlled steering input.

18. The one or more non-transitory computer-readable media of claim 16, wherein the second reference trajectory is based at least in part on a kinematic or a dynamic constraint of the vehicle to navigate in the environment.

19. The one or more non-transitory computer-readable media of claim 16, wherein determining the trajectory is further based at least in part on at least one of a reference cost, a steering cost, an acceleration cost, or an obstacle cost associated with the second reference trajectory.

* * * * *